(12) United States Patent
Gocek et al.

(10) Patent No.: US 9,928,049 B2
(45) Date of Patent: Mar. 27, 2018

(54) IDENTIFYING UNMATCHED REGISTRY ENTRIES

(71) Applicant: International Business Machines Corporation, Armonk, NY (US)

(72) Inventors: Pawel Gocek, Łódź (PL); Piotr Kania, Kraków (PL); Michal Paluch, Kraków (PL); Tomasz Stopa, Kraków (PL)

(73) Assignee: International Business Machines Corporation, Armonk, NY (US)

( * ) Notice: Subject to any disclaimer, the term of this patent is extended or adjusted under 35 U.S.C. 154(b) by 215 days.

(21) Appl. No.: 14/801,481

(22) Filed: Jul. 16, 2015

(65) Prior Publication Data

US 2016/0026448 A1 Jan. 28, 2016

(30) Foreign Application Priority Data

Jul. 24, 2014 (GB) .................................. 1413100.7

(51) Int. Cl.
G06F 9/445 (2006.01)
(52) U.S. Cl.
CPC ............ G06F 8/61 (2013.01); G06F 9/44505 (2013.01); *G06F 8/62* (2013.01)
(58) Field of Classification Search
CPC ........... G06F 8/61; G06F 8/62; G06F 9/44505
See application file for complete search history.

(56) References Cited

U.S. PATENT DOCUMENTS

| 7,350,191 B1* | 3/2008 | Kompella ................. G06F 8/61 707/999.005 |
| 8,296,312 B1 | 10/2012 | Leung et al. |
| 8,490,076 B2 | 7/2013 | Wolf et al. |
| 8,539,445 B2* | 9/2013 | Gangemi ................. G06F 8/60 717/120 |
| 2003/0110253 A1 | 6/2003 | Anuszczyk et al. |

(Continued)

FOREIGN PATENT DOCUMENTS

WO WO2006088706 A2 8/2006

OTHER PUBLICATIONS

Wikipedia, "Native (computing," 2013, pp. 1-2, downloaded from The Wayback Machine Internet Archive at <URL>: https://web.archive.org/web/20130305012255/https://en.wikipedia.org/wiki/Native_(computing).*

(Continued)

*Primary Examiner* — Tuan Q. Dam
*Assistant Examiner* — Stephen Berman
(74) *Attorney, Agent, or Firm* — Yee & Associates, P.C.; Jeffrey S. LaBaw

(57) ABSTRACT

A method and a related system for identifying unmatched registry entries may be provided. The method may comprise scanning a file system and discovering software based on a file signature, collecting first attributes of the discovered software, collecting native registry entries, and comparing the first attributes against second attributes of the collected registry entries based on a filtering rule. Thereby, the registry entries may be grouped into two groups. One group may represent matched registry entries and the other group may represent unmatched registry entries. The unmatched registry entries may be identified as unequivocal entries for further software discovery.

3 Claims, 5 Drawing Sheets

(56) References Cited

U.S. PATENT DOCUMENTS

| | | |
|---|---|---|
| 2005/0155031 A1 | 7/2005 | Wang et al. |
| 2005/0193216 A1* | 9/2005 | Gurda ................ G06F 11/3051 726/22 |
| 2005/0278395 A1 | 12/2005 | Sandaire |
| 2006/0095925 A1 | 5/2006 | Roth et al. |
| 2006/0184932 A1* | 8/2006 | Burnley ................... G06F 8/60 717/174 |
| 2007/0198973 A1* | 8/2007 | Choi ........................ G06F 8/61 717/151 |
| 2009/0248636 A1* | 10/2009 | Gangemi ................. G06F 8/60 |
| 2010/0223306 A1* | 9/2010 | Liu ..................... G06F 9/44505 707/822 |
| 2011/0219146 A1* | 9/2011 | Jacobson ................. G06F 8/60 710/8 |
| 2011/0270817 A1* | 11/2011 | Dettinger .......... G06F 17/30427 707/706 |
| 2012/0054733 A1* | 3/2012 | Vidal ....................... G06F 8/65 717/171 |
| 2012/0290530 A1 | 11/2012 | Saner |
| 2013/0014096 A1* | 1/2013 | Mayo ....................... G06F 8/62 717/170 |
| 2013/0080511 A1 | 3/2013 | Majka et al. |
| 2013/0124529 A1* | 5/2013 | Jacob ................ G06F 9/44505 707/740 |
| 2013/0173770 A1* | 7/2013 | Kowalski ........... G06F 9/44505 709/223 |
| 2013/0174138 A1* | 7/2013 | Kania ...................... G06F 8/65 717/171 |
| 2015/0172060 A1* | 6/2015 | Mahaffey ................ G06F 8/70 713/176 |
| 2015/0339111 A1* | 11/2015 | Kedia ...................... G06F 8/61 717/176 |
| 2015/0363189 A1* | 12/2015 | Nakamura ............... G06F 8/65 717/169 |

OTHER PUBLICATIONS

Pallis et al., "Effective Keyword Search for Software Resources Installed in Large-Scale Grid Infrastructures," 2009, Proceedings of the 2009 IEEE/WIC/ACM International Joint Conference on Web Intelligence and Intelligent Agent Technology, vol. 1, pp. 482-489, downloaded from the Internet at <url>:http://delivery.acm.org/10.1145/1640000/1632390/3.*

Magoutis et al., "Galapagos: Automatically Discovering Application-Data Relationships in Networked Systems," 2007, 10th IFIP/IEEE International Symposium on Integrated Network Management, pp. 701-704, downloaded from the Internet at <url>:http://ieeexplore.ieee.org/stamp/stamp.jsp?arnumber=4258583.*

Mee et al., "The Windows Registry as a forensic artefact: Illustrating evidence collection for Internet usage," 2006, Digital Investigation, vol. 3, Issue, 3, pp. 166-173, downloaded from the Internet at <url>:https://ac.els-cdn.com/S1742287606000946/1-s2.0-S1742287606000946-main.pdf?_tid=fbea9c7c-b287-11e7-a393-00000aab0f26&acdnat=1508168458_15ac0.*

Intellectual Property Office Search Report, dated Jan. 23, 2015, regarding Application No. GB1413100.7, 6 pages.

"CCleaner Features," Piriform Ltd., copyright 2005-2015, 2 pages. http://www.piriform.com/ccleaner/features.

"TweakNow RegCleaner, Version 7.3.1," TweakNow, Nov. 21, 2013, 2 pages. http://tweaknow.com/RegCleaner.php.

"Viewing unmactched registry entries," IBM Tivoli Asset Discovery for Distributed, Version 7.5, IBM Corporation, copyright 2002, 2014, 1 page. http://www-01.ibm.com/support/knowledgecenter/SSHT5T_7.5.0/com.ibm.tad4d75.doc/com.ibm.license.mgmt.adrnin.doc/t_viewing_unrecognized_software.html.

* cited by examiner

IDENTIFYING UNMATCHED REGISTRY ENTRIES

CROSS-REFERENCE TO RELATED APPLICATION(S)

This application claims the benefit of priority to United Kingdom Patent Application No. GB1413100.7, filed Jul. 24, 2014, the entire contents of which are incorporated herein by reference.

FIELD OF THE INVENTION

The invention relates generally to a method for identifying unmatched registry entries. The invention relates further to a system for identifying unmatched registry entries, a data processing program, and a computer program product.

BACKGROUND OF THE INVENTION

Modern data centers are managed using system management software or software asset management systems. These may need a comprehensive knowledge of installed software of the managed computing systems. However, there may be circumstances that lead to a mismatch between software that may be registered in a software catalog, e.g. a registry, and software that is actually installed on a given computing system. In order to properly manage the computing systems, it may be required to have a good match between supposedly installed software and actually installed software on a given computing system.

Several approaches have been made for discovering installed software on a given computing system. For example, the document U.S. Pat. No. 8,539,445 B2 discloses a method and a corresponding system and computer usable-medium for discovering software products on a plurality of computers. The discovering methods can populate a software catalog without the manual intervention of an administrator. Such an approach would reduce the cost of producing and maintaining a comprehensive knowledge base, which contains definitions of software products and the related signature.

Another approach has been disclosed by document WO 2006/088706 A2. Here, a method and apparatus are disclosed for identifying and cataloging software assets contained in a networked computer. In accordance with one embodiment, there is a method provided comprising providing a data warehouse including a master catalog file. The master catalog file comprises a software items table of attributes, a software packages table of attributes, and a mapping rule for mapping certain software item entries to certain software package entries.

However, the problem still exists that a mismatch may occur between registered software and software that may actually be installed on a computing system.

SUMMARY OF THE INVENTION

This need may be addressed by a method for identifying unmatched registry entries, a system for identifying unmatched registry entries, a data processing program, and a computer program product, according to the independent claims.

According to one aspect, a method for identifying unmatched registry entries may be provided. The method may comprise scanning a file system and discovering software, in particular based on a file signature. The method may also comprise collecting first attributes of the discovered software and collecting native registry entries.

Additionally, the method may comprise comparing—in particular filtering—the first attributes against second attributes of the collected native registry entries based on a filtering rule, thereby grouping the native registry entries into two groups. One group may represent matched registry entries and the other group may represent unmatched registry entries. Thereby, unmatched registry entries may be identified as unequivocal entries for further software discovery.

According to another aspect, a system for identifying unmatched registry entries may be provided. The system may comprise a scanning unit adapted for scanning a file system and discovering software based on a file signature and a collection unit adapted for collecting first attributes of the discovered software, and it may also be adapted for collecting native registry entries.

Furthermore, the system may comprise a comparison unit adapted for comparing the first attributes against second attributes of the collected native registry entries based on a filtering rule. Thereby, the native registry entries may be grouped into two groups. One group may represent matched registry entries and the other group may represent unmatched registry entries. Thus, unmatched registry entries may be identified as unequivocal entries for further software discovery.

It may be noted that matched registry entries may relate to registry entries for which matching installed software has been discovered in the file system. In the same sense, unmatched registry entries may relate to registry entries for which not any matching installed software components have been detected in the file system.

Actually, the comparison may only be made between one attribute of the discovered software with a relating attribute of a registry entry.

DETAILED DESCRIPTION

It may also be noted that discovered software may relate to software installed on a machine that has been identified by a scanning process of the file system.

In the context of this description, the following conventions, terms and/or expressions may be used:

A "registry" may denote data storage, e.g., a database—that may store configuration settings—in particular, of software products and/or services and its extensions—on an operating system of a computing system. It may contain settings for low-level operating system services as well as for applications running on the platform using the registry. A registry may be a "native registry" if such a registry may be an integral part of the underlying operating system.

The term "unmatched registry entry" may denote an entry in a registry of supposedly installed software on a platform comprising a machine and an operating system. The machine may be a physical machine or a virtual machine. The term machine may here be equivalent to the term system or computing system. The registry entry may be named "unmatched" if no real software installation on the machine of the supposedly installed software from the registry may be found in the file system. Thus, the registry comprises an entry of software that in reality may not be installed at all on the machine.

In a similar sense, the term "matched registry entry" may be interpreted. In this case, the matched registry entry may reflect an installed piece of software on the machine. The software may be application software, middleware, part of an operating system, a service, and/or comparable elements. It may also refer to content, a catalogue or a database. If during the matching process between registry entries and actually installed software components it may turn out that there is a match, then the registry entry may be "filtered out" because no further processing, handling or investigation may be required for the specific registry entry: Reality reflects the registry entry.

The term "scanning" may denote searching a file system of a computing system for installed software. The software may be identified by several characteristics (see below).

The term "discovering" may denote finding an installed software component during the scanning process (see above).

The term "file signature" may denote data used to identify or verify the content of a file. In particular, it may refer to, e.g., a file magic number, i.e., bytes within a file used to identify the format of the file; sometimes a short sequence of bytes (often 2 to 4 bytes long) placed at the beginning of the file; or, a file checksum, or more generally, a result of a hash function over the file content. The file signature may also be included in the middle of the file, or at the end of the file or in a separate file. Other mechanisms for identifying files, in particular, those files being executable software, may be used. Some other attributes are named below.

The term "first attributes" may denote characteristic elements of a file in a files system, e.g., of executable software. An attribute may be a component of the file signature. A file signature may comprise several attributes. One example of an attribute may be a file name or file path.

The term "similarity comparison" algorithm may denote a comparison of typically two strings having a plurality of characters. A comparison result of the two strings may return a comparison value between 0 and 1. A complete match, i.e. identity, of the two strings may deliver a comparison value of "1". If the strings may not be completely identical, another comparison value lower than "1" may be returned. Examples of algorithms for the similarity comparison are mentioned below.

The term "software path rule" may denote a rule based on a comparison of a file path. An exact match of a compared file path may be required. FIG. 2 and the related description describe more details of the software path rule.

The term "similarity rule" may denote an algorithm based on a similarity comparison. FIG. 3 and the related description describe more details of the similarity rule.

The proposed method for identifying unmatched registry entries may offer a couple of advantages:

Today, server computers may have a long list of software application installed on them. The same may apply for personal devices such as smart phones as well as all system categories in between. However, finding out whether software components that may be registered in a registry of the underlying operating system may actually be installed on the related computing system may be a lengthy process. The software scan process may be time and resource consuming, potentially slowing down the executed application or system programs and services. The larger and older a system or machine becomes, the higher the probability may be to have a mismatch between registry entries of supposedly installed and actually installed software.

The here proposed method and system allows to decrease the processing time when software scans may be performed. Only unequivocal native registry entries may be processed. Required time for a match/un-match process may be reduced saving costs and computation time. The complete process of matching registry entries with actually installed software may be simplified.

According to one embodiment of the method, the discovered software may be selected to comprise directly executable software elements as well as software fragments. Thus, not only complete large scale application software programs may be managed with the proposed method but also software components like, e.g., web services and similar software implemented functions.

According to a further embodiment of the method, the first attributes of the discovered software and second attributes of the collected native registry entries may be selected to comprise at least one out of the group comprising a software file path, a software file header, a software product name, a software product version, a software product vendor, a software key, and a software product patch level. Thus, several characteristics of installed software components may be used. Not only a simple one dimensional search strategy may be followed but a complex multi-characteristics scanning and discovery process may be used.

In one additional embodiment of the method, according to the filtering rule, a native registry entry may be assigned to the group of matching registry entries, in particular, "filtered out" the related entry—if a software file path of the discovered software is equal to a file path of the entry of registered software in the registry. Otherwise, the software may remain in the status "undiscovered".

In one further embodiment of the method, a native registry entry is marked as invalid if not any software file path of discovered software matches any software file path of the native registry entry. This may deliver an indication that this registry entry may no longer be required. It may be deleted or cleaned at a later stage of a maintenance process.

According to an enhanced embodiment of the method, a native registry entry may be marked as matching if a similarity comparison algorithm delivers a comparison value higher than a predefined comparison threshold. In particular, if the comparison threshold may exceed a value of 0.8 the registry entry may be marked as matching. The comparison value may have a range from 0 to 1.

According to an even more enhanced embodiment of the method, the similarity comparison algorithm may be selected out of the group comprising a Jaro Winkler distance, a Levenstein distance, a Damerau-Levenstein distance, a Longest Common Sub-Sequence distance, and a Hamming distance. Thus, any known string matching algorithm may be used. The method may not be limited to the named similarity comparison algorithms. Further similarity comparisons may be applied.

In a further embodiment of the method, the filtering rule may be selected to comprise a similarity comparison algorithm which may be applied for comparing name attributes of the collected native registry entries with name attributes of the discovered software. The comparison may be extended to other applicable attributes.

According to one embodiment of the method, a native registry entry may be assigned into the group of matched registry entries—i.e., marked to be filtered out or sorted out of the group of the unmatched entries in the registry—if the comparison value is higher than a predefined threshold. In addition, a native registry entry may be assigned into the group of unmatched registry entries—and thus, being kept in the group of unregistered entries—if the comparison value is lower than the redefined threshold value.

A further enhanced embodiment of the method may also comprise comparing by a similarity comparison a first member of the group of unmatched registry entries with a second member of the group of unmatched registry entries, and assigning a complete group of registry entries relating to the second member of the group of unmatched registry entries to the group of matched registry entries if the result of the related similarity comparison is higher than a predefined related threshold, and if the first member of the group of unmatched registry entries was assigned before into the group of matched registry entries, in particular by the software path rule or the similarity rule.

An even more enhanced embodiment of the method may also comprise comparing by a similarity comparison a first member of the group of unmatched registry entries with a second member of the group of unmatched registry entries, and assigning a complete group of registry entries relating to the second registry entry into the group of unmatched registry entries, if the result of the related similarity comparison may be lower than a predefined related threshold and if the first member of the group of unmatched registry entries was assigned before into the group of unmatched registry entries, meaning they are kept in the group of unmatched registry entries. Also here, both, the software path rule or the similarity rule may have been applied.

And, a comprehensive embodiment of the method may also comprise comparing by a similarity comparison a first member of the group of unmatched registry entries with a second member of the group of unmatched registry entries, and assigning the second registry entry into the group of unmatched registry entries, if the first registry entry was grouped as an unmatched registry entry by a software path rule, and if the first registry entry was marked as a matched registry entry by a similarity rule, or vice versa. This may mean that not a clear decision could be made whether a match of attributes is true or false, i.e., the comparison value is lower than and higher than the threshold depending on the rule used. Consequently, the related registry entry has to be kept in the group of unmatched registry entries.

Furthermore, embodiments may take the form of a computer program product, accessible from a computer-usable or computer-readable medium providing program code for use, by or in connection with a computer or any instruction execution system. For the purpose of this description, a computer-usable or computer-readable medium may be any apparatus that may contain means for storing, communicating, propagating or transporting the program for use, by or in a connection with the instruction execution system, apparatus, or device.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

It should also be noted that embodiments of the invention have been described with reference to different subject-matters. In particular, some embodiments have been described with reference to method type claims whereas other embodiments have been described with reference to apparatus type claims. However, a person skilled in the art will gather from the above and the following description that, unless otherwise notified, in addition to any combination of features belonging to one type of subject-matter, also any combination between features relating to different sub-ject-matters, in particular, between features of the method type claims, and features of the apparatus type claims, is considered as to be disclosed within this document.

The aspects defined above and further aspects of the present invention are apparent from the examples of embodiments to be described hereinafter and are explained with reference to the examples of embodiments, but to which the invention is not limited.

BRIEF DESCRIPTION OF THE DRAWINGS

Preferred embodiments of the invention will now be described, by way of example only, and with reference to the following drawings.

DETAILED DESCRIPTION OF EXEMPLARY EMBODIMENTS

In the following, a detailed description of the figures will be given. All instructions in the figures are schematic. Firstly, a block diagram of an embodiment of the inventive method for identifying unmatched registry entries is given. Afterwards, further embodiments of the method and the related system for identifying unmatched registry entries will be described.

Figure 1:
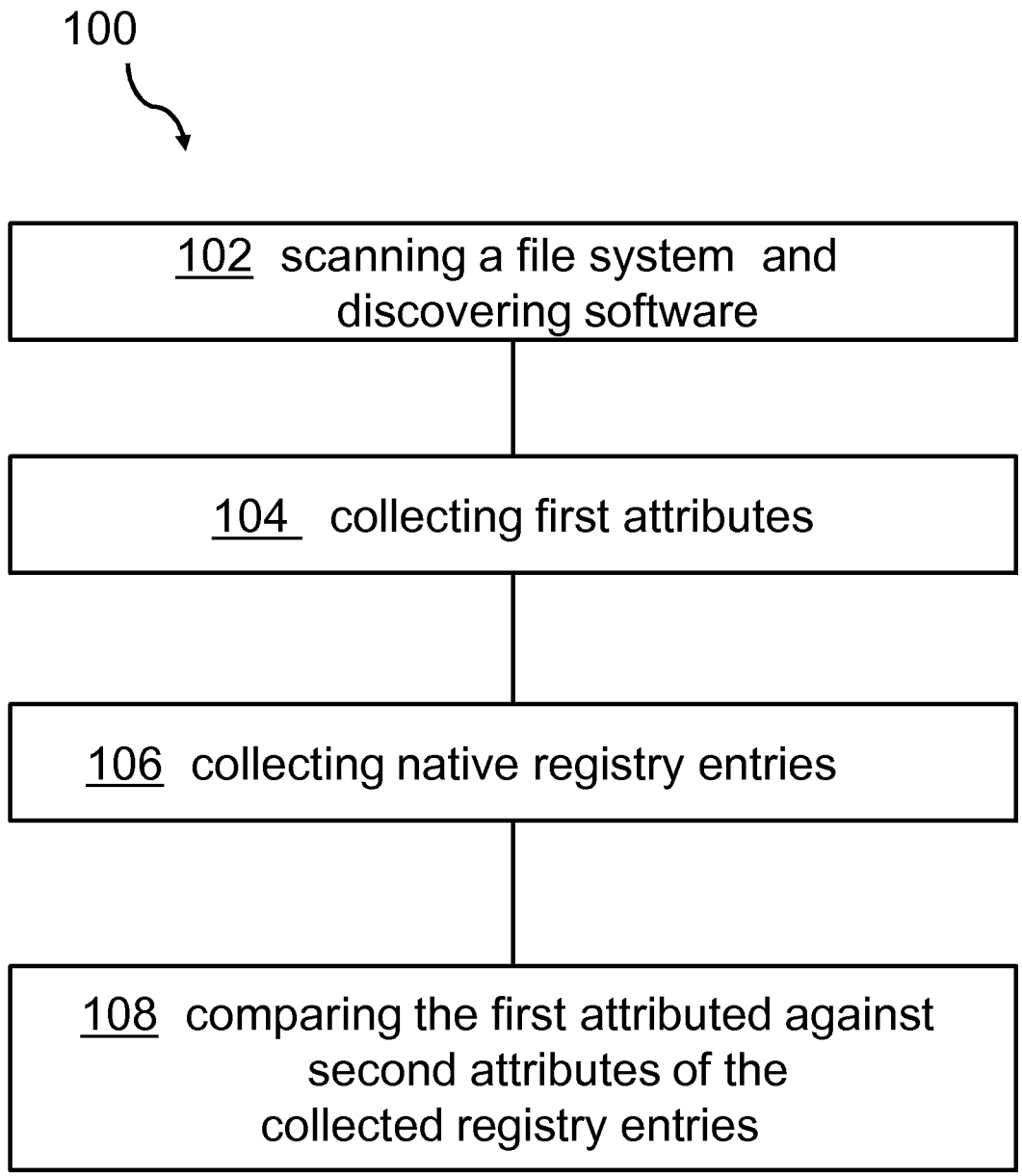
FIG. 1 shows a block diagram of an embodiment of the inventive method for discovering unmatched registry entries.

FIG. 1 shows a block diagram of an embodiment of the method 100 for identifying unmatched registry entries. The method 100 may comprise scanning, 102, a file system and discovering software—e.g., directly executable software and/or web or other services—based on a file signature. Additionally, first attributes of the discovered software may be collected, 104, during the scanning, 102; in particular, the file signatures may relate to the first attributes. The method may also comprise collecting, 106, native registry entries. In a next step, the method may comprise comparing, 108, in particular filtering, the first attributes against second attributes of the collected registry entries based on a filtering rule. Thereby, the registry entries may be grouped into two groups. One group may represent matched registry entries and the other group may represent unmatched registry entries. Hence, unmatched registry entries may be identified as unequivocal entries for further software discovery. This may represent an elegant way of cleaning registries of uninstalled software entries.

Figure 2:
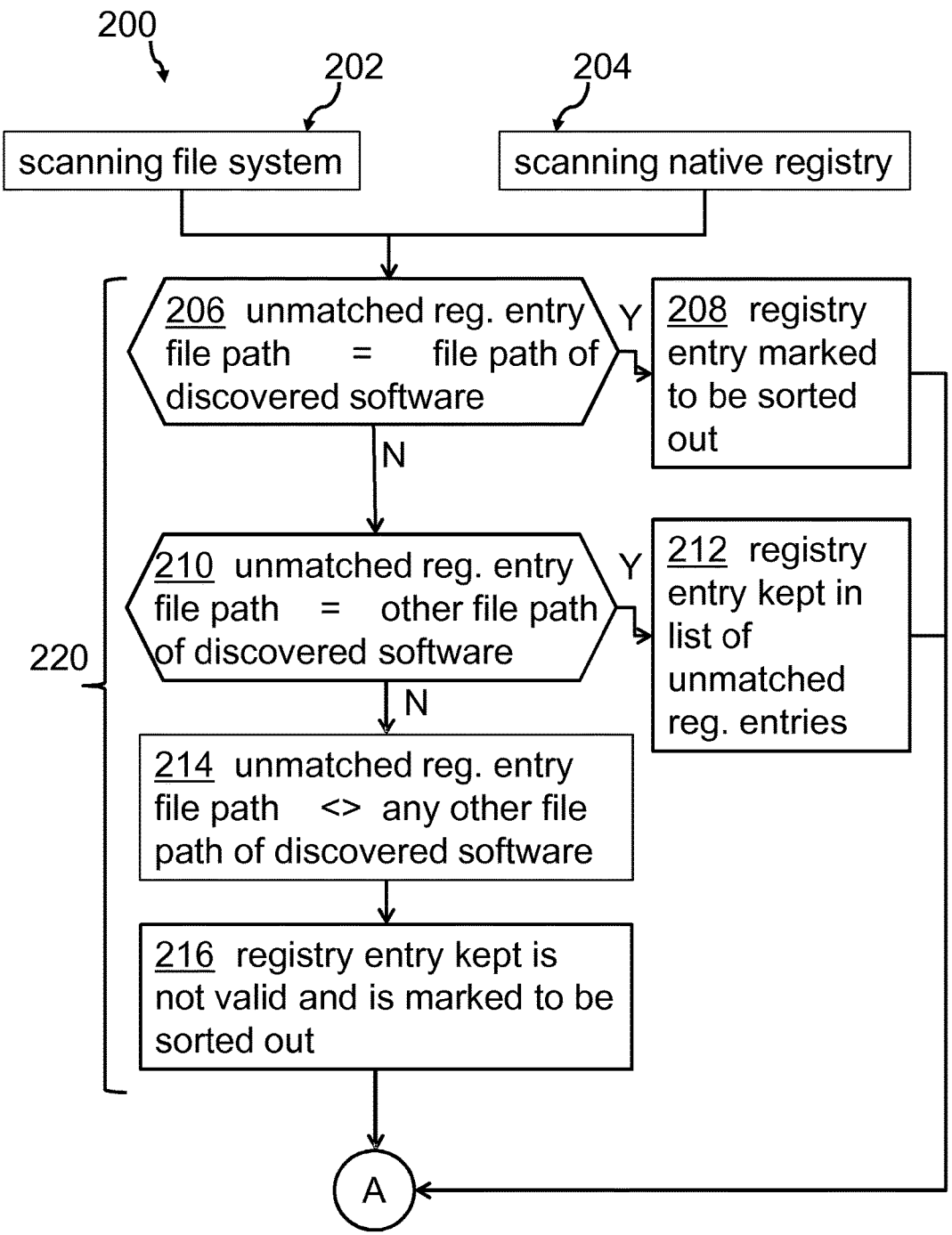
FIG. 2 shows a more detailed block diagram of FIG. 1.

FIG. 2 shows a more detailed block diagram 200 of FIG. 1. In a file system scanning step 202, the file system of a computer system may be scanned. This may be in accordance with block 102 of FIG. 1. As a result of the file system scanning step 202, one or more pieces of discovered software may be presented, representing actually installed software. Also, first attributes of the discovered software may be collected—collect step 104 of FIG. 1. A registry scanning step 204, corresponding to block 106 of FIG. 1, represents a scanning of a native registry which may be part of an operating system running on a machine. The machine may be a hardware system, i.e., computing system, running an operating system or, it may be a virtual machine running an operating system. As a result of the registry scanning step 204, one or more found native registry entries may be presented. In a first testing step 206, it may be tested whether a file path of a found native registry entry is identical to a file path of discovered software from the file system scanning step 202. In case of "yes", in a sorting step 208, the respective native registry entry may be marked to be sorted out or filtered out of a group of unmatched registry entries, because a match has been found between the native registry entry and actually installed software. It may be noted that initially all native registry entries may be treated as unmatched registry entries building a group of unmatched entries.

In case of "no", it may be tested, in a second testing step 210, whether a file path of a found native registry entry matches the file path of another discovered software. In case of "yes", the found native registry entry is assigned to the group of matched registry entries, 212. In case of "no", it is determined in a determination step 214 that the file path of the found native registry entry does not match any other file path of any discovered software. In this case, in a keeping step 216, the found native registry entry is marked as an unmatched registry entry and marked to be sorted out of the registry entries.

The method steps 206 to 216 may be named "software path rule" because a decision may be based on a file path of related discovered software. This software path rule may end at "A".

Figure 3:
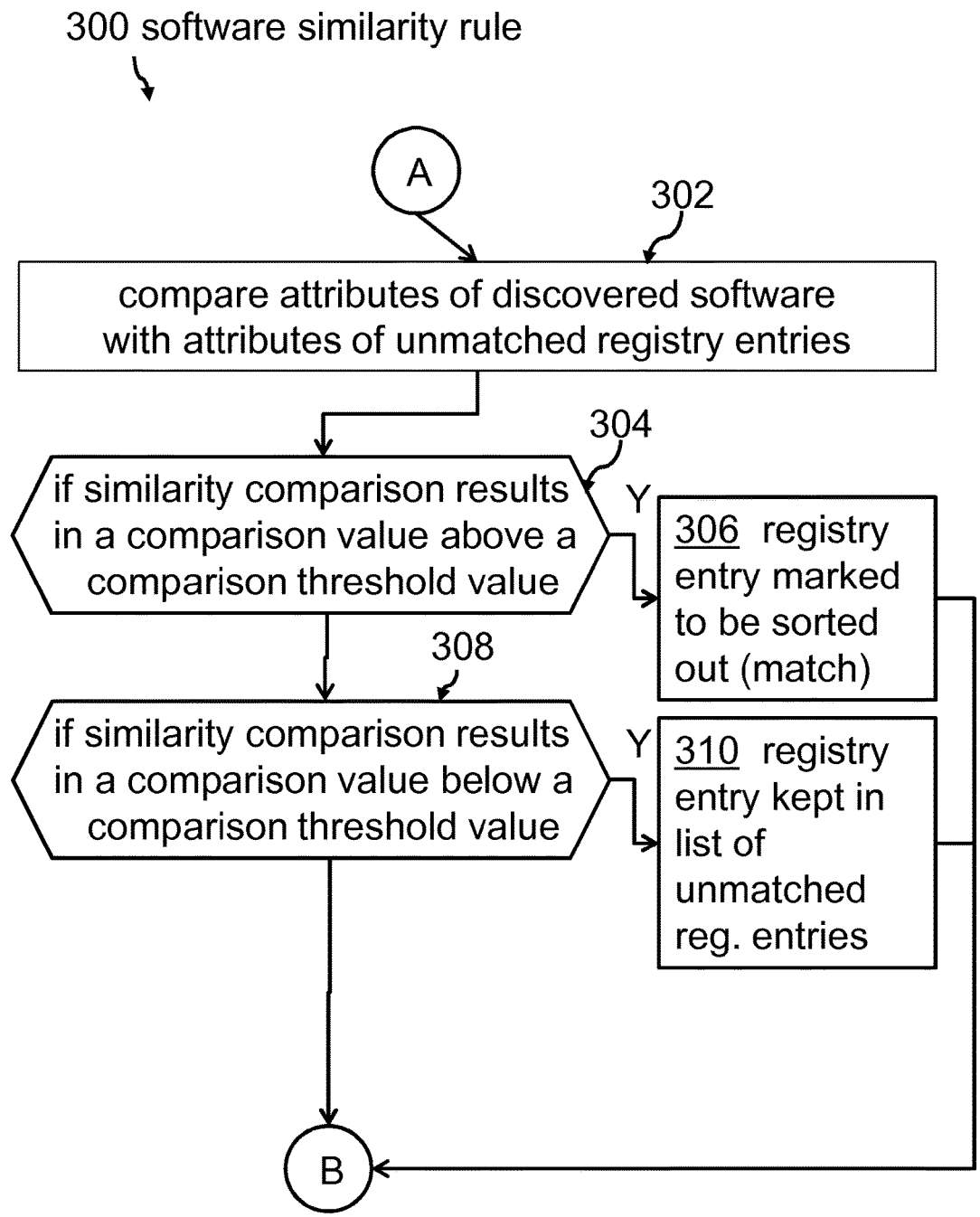
FIG. 3 shows a continuation of the block diagram of FIG. 2.

In contrast to FIG. 2, FIG. 3 describes steps of a software similarity rule 300 for deciding how to further treat registry entries during a software discovery process. Here, in a compare step 302, attributes of discovered software may be compared with attributes of still unmatched registry entries. The comparison may not be a 1:1 comparison, but a similarity comparison. If the result of the similarity comparison delivers a comparison value higher than a predefined comparison threshold value—which may be determined in comparison step 304—then the related registry entry may be marked to be sorted out in a sorting-out step 306. This means that a match has been found between a registry entry and discovered software even if, e.g., an expected file path may not match.

If on the other side, in case of "No" in step 304, the similarity comparison may reside in a comparison value lower than a comparison threshold value—which may be determined in comparison step 308—then the related registry entry may be kept in the list of unmatched registry entries in a keeping step 310. All above mentioned similarity comparison algorithms may be used here.

In case of "no" at comparison step 308 the control flow may continue to "B". This whole part of the algorithm may be an extended version of the method 100 and may end at "B".

Figure 4:
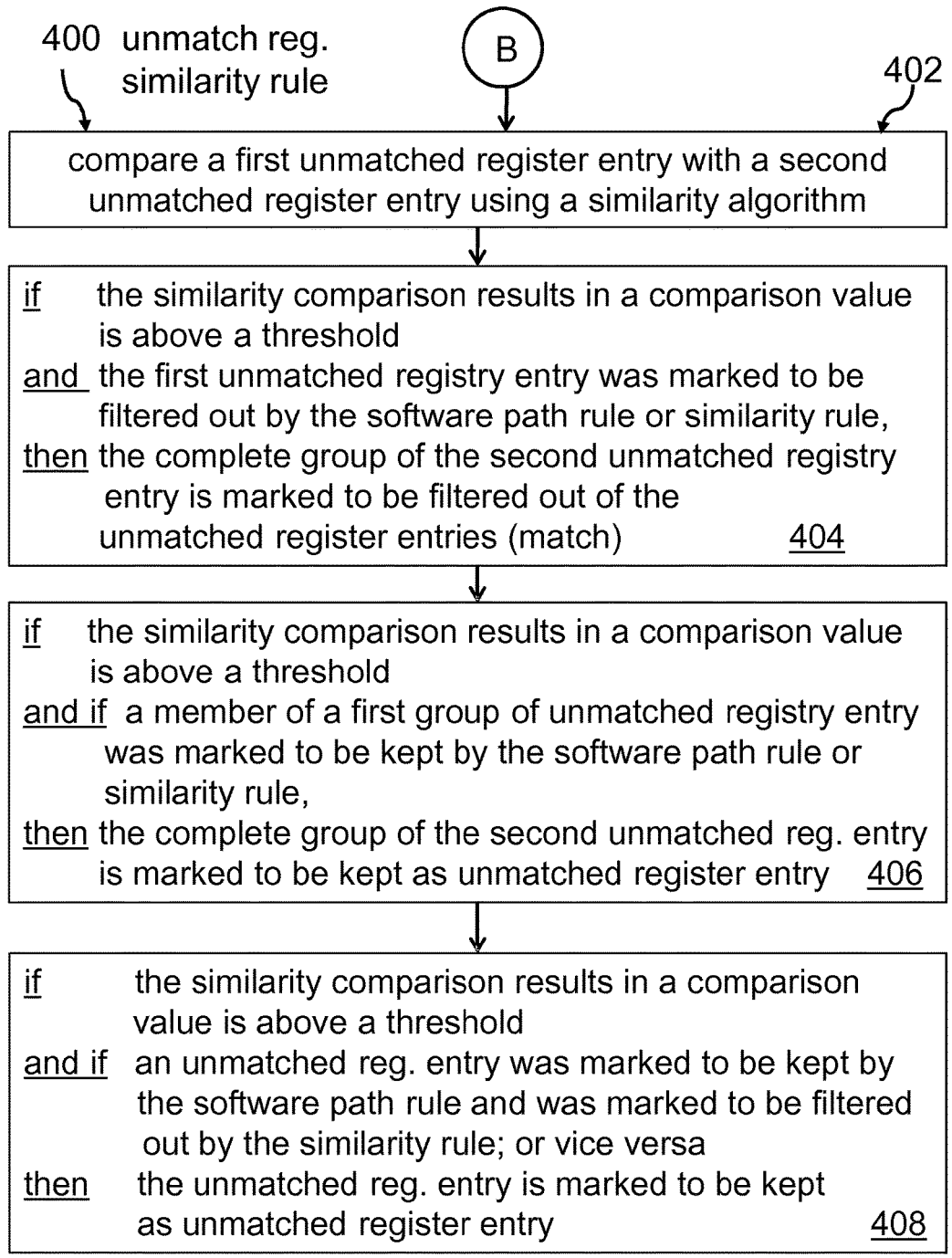
FIG. 4 shows a continuation of the block diagram of FIG. 3.

In FIG. 4, the block diagram 300 of FIG. 3 is continued at "B" in block diagram 400. Next, in a comparison step 402, a comparison is made between a first unmatched registry entry and a second unmatched registry entry using a similarity algorithm. If that similarity comparison may result in a comparison value higher than a predefined threshold, and the first unmatched registry entry was marked to be filtered out by the software path rule or the similarity rule, then the complete group relating to the second unmatched registry entry is marked to be filtered out of the unmatched registry entries. This means that a decision is made that the related complete group of the so far unmatched registry entries will now be grouped into the group of matched registry entries. This part of the algorithm is expressed in determination step 404 of FIG. 4.

If, on the other hand, in determination step 406, the similarity comparison results in a comparison value higher than the predefined threshold value and if any of a group of the first unmatched registry entries was marked to be kept by the software path rule or the similarity rule then the complete group of registry entries belonging to the second unmatched registry entry is marked to be an unmatched registry entry each.

If, in another case determined in determination step 408, the similarity comparison results in a comparison value higher than that predefined threshold, and if an unmatched registry entry was marked to be kept by the software path rule and was marked to be filtered out by the similarity rule—or vice versa—then the unmatched registry entry is marked to be an unmatched registry entry, i.e., kept in the group of unmatched registry entries for further software discovery.

These more advanced rules for filtering out or keeping registry entries in the group of unmatched registry entries may also be named unmatched registry similarity rule. This rule, which may be extendable by more conditions, may allow for a comprehensive decision process whether to keep registry entries in the group of unmatched registry entries or move them to the group of matched registry entries. Depending on the grouping for the more advanced software, a discovery mechanism in the file system may be applied in order to discover software components which still have an unmatched registry entry. In case no match may be found between an entry in the group of unmatched registry entries and a related software in the file system of the machine it may be decided to delete the related registry entry.

Figure 5:
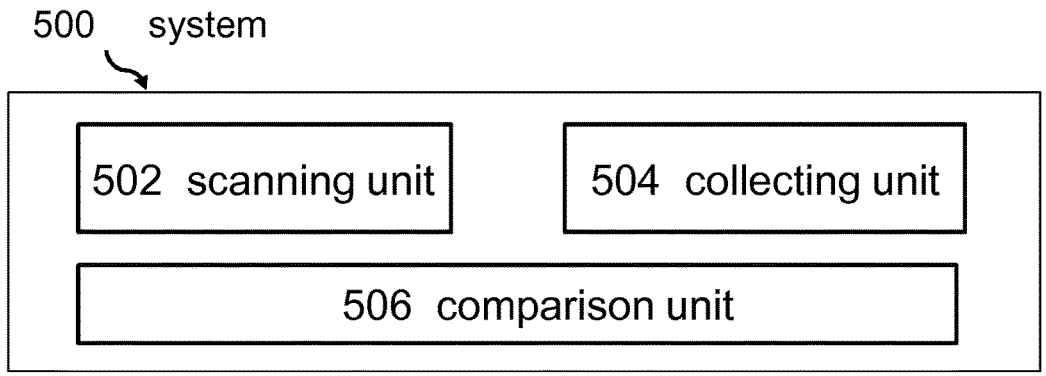
FIG. 5 shows an embodiment of a system for identifying unmatched registry entries.

FIG. 5 shows an embodiment of a system 500 for identifying unmatched registry entries. The system 500 may comprise a scanning unit 502 adapted for scanning a file system and discovering software based on a file signature and a collection unit 504 adapted for collecting first attributes of the discovered software, and may also be adapted for collecting native registry entries.

Furthermore, the system may comprise a comparison unit 506 adapted for comparing the first attributes against second attributes of the collected registry entries based on a filtering rule, thereby grouping the registry entries into two groups, wherein one group represents matched registry entries and the other group represents unmatched registry entries, thereby identifying unmatched registry entries as unequivocal entries for further software discovery.

Figure 6:
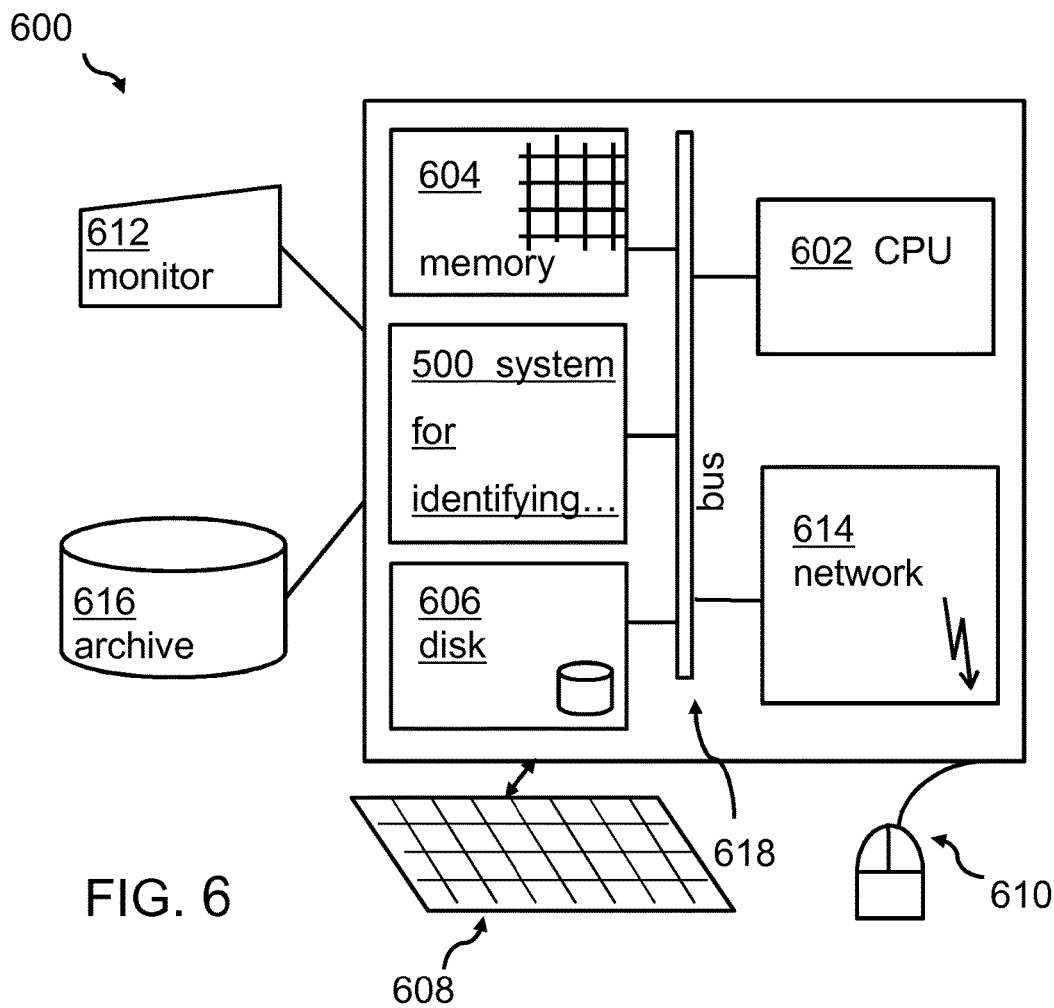
FIG. 6 shows an embodiment of a computer system.

Embodiments of the invention may be implemented together with virtually any type of computer, regardless of the platform being suitable for storing and/or executing program code. For example, as shown in FIG. 6, a computing system 600 may include one or more processor(s) 602 with one or more cores per processor, associated memory elements 604, an internal storage device 606 (e.g., a hard disk, an optical drive, such as a compact disk drive or digital video disk (DVD) drive, a flash memory stick, a solid-state disk, etc.), and numerous other elements and functionalities, typical of today's computers (not shown). The memory elements 604 may include a main memory, e.g., a random access memory (RAM), employed during actual execution of the program code, and a cache memory, which may provide temporary storage of at least some program code and/or data in order to reduce the number of times, code and/or data must be retrieved from a long-term storage medium or external bulk storage 616 for an execution.

Elements inside the computer 600 may be linked together by means of a bus system 618 with corresponding adapters. Additionally, the system for identifying unmatched registry entries 600 may be attached to the bus system 618.

The computing system 600 may also include input means such as a keyboard 608, a pointing device such as a mouse 610, or a microphone (not shown). Alternatively, the computing system may be equipped with a touch sensitive screen as main input device. Furthermore, the computer 600, may include output means such as a monitor or screen 612 [e.g., a liquid crystal display (LCD), a plasma display, a light emitting diode display (LED), or cathode ray tube (CRT) monitor]. The computer system 600 may be connected to a network [e.g., a local area network (LAN), a wide area network (WAN)], such as the Internet or any other similar type of network, including wireless networks via a network interface connection 614. This may allow a coupling to other computer systems, or a storage network, or a tape drive. Those, skilled in the art will appreciate that many different types of computer systems exist, and the aforementioned input and output means may take other forms. Generally speaking, the computer system 600 may include at least the minimal processing, input and/or output means, necessary to practice embodiments of the invention.

While the invention has been described with respect to a limited number of embodiments, those skilled in the art, having benefit of this disclosure, will appreciate that other embodiments may be devised, which do not depart from the scope of the invention, as disclosed herein. Accordingly, the scope of the invention should be limited only by the attached claims. Also, elements described in association with different embodiments may be combined. It should also be noted that reference signs in the claims should not be construed as limiting elements.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain, or store, a program for use, by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that may communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++, or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described with reference to flowchart illustrations and/or block diagrams of methods, apparatus (systems) and computer program products according to embodiments of the present disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions, which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions, which execute on the computer or other programmable apparatus, provide processes for implementing the functions/acts specified in the flowchart and/or block diagram, block, or blocks.

The block diagrams in the Figures illustrate the architecture, functionality, and operation of possible implementations of systems, methods and computer program products, according to various embodiments of the present disclosure. In this regard, each block in the block diagrams may represent a module, segment, or portion of code, which comprises one or more executable instructions for implementing the specified logical function(s). It should also be noted that, in some alternative implementations, the functions, discussed hereinabove, may occur out of the disclosed order. For example, two functions taught in succession may, in fact, be executed substantially concurrently, or the functions may sometimes be executed in the reverse order depending upon the functionality involved. It will also be noted that each block of the block diagrams, and combinations of blocks in the block diagrams, may be implemented by special purpose hardware-based systems that perform the specified functions or acts, or combinations of special purpose hardware and computer instructions.

The terminology used herein is for the purpose of describing particular embodiments only and is not intended to limit the invention. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiment was chosen and described in order to best explain the principles of the invention and the practical application, and to enable others of ordinary skills in the art to understand the invention for various embodiments with various modifications, as are suited to the particular use contemplated.

The invention claimed is:

1. A method for identifying unmatched registry entries, comprising:
    scanning a file system and discovering software;
    collecting first attributes of the discovered software;
    collecting native registry entries;
    comparing the first attributes of the discovered software against second attributes of the collected native registry entries based on a filtering rule, thereby grouping the native registry entries into two groups, wherein one group represents matched registry entries and the other group represents unmatched registry entries, thereby identifying the unmatched registry entries as unequivocal entries for further software discovery;
    comparing by a similarity comparison a first member of the group of unmatched registry entries with a second member of the group of unmatched registry entries; and
    assigning a complete group of related registry entries relating to the second member of the group of unmatched registry entry to the group of matched registry entries if a result of the similarity comparison is higher than a predefined related threshold, and if the first member of the group of unmatched registry entries was assigned before into the group of matched registry entries.

2. A method for identifying unmatched registry entries, comprising:
    scanning a file system and discovering software;
    collecting first attributes of the discovered software;
    collecting native registry entries;
    comparing the first attributes of the discovered software against second attributes of the collected native registry entries based on a filtering rule, thereby grouping the native registry entries into two groups, wherein one group represents matched registry entries and the other group represents unmatched registry entries, thereby identifying the unmatched registry entries as unequivocal entries for further software discovery;
    comparing by a similarity comparison a first member of the group of unmatched registry entries with a second member of the group of unmatched registry entries; and
    assigning a complete group of related registry entries into the group of unmatched registry entries, if a result of the similarity comparison is lower than a predefined related threshold and if the first member of the group of unmatched registry entries was assigned before into the group of matched registry entries.

3. A method for identifying unmatched registry entries, comprising:
    scanning a file system and discovering software; collecting first attributes of the discovered software;
    collecting native registry entries;
    comparing the first attributes of the discovered software against second attributes of the collected native registry entries based on a filtering rule, thereby grouping the native registry entries into two groups, wherein one group represents matched registry entries and the other group represents unmatched registry entries, thereby identifying the unmatched registry entries as unequivocal entries for further software discovery;
    comparing by a similarity comparison a first member of the group of unmatched registry entries with a second member of the group of unmatched registry entries; and
    assigning the second member of the group of unmatched registry entries into the group of unmatched registry entries, if the first registry entry was grouped as an unmatched registry entry by a software path rule, and if the first registry entry was marked as a matched registry entry by a similarity rule, and assigning the second member of the group of unmatched registry entries into the group of unmatched registry entries, if the first registry entry was grouped as a matched registry entry by a software path rule, and if the first registry entry was marked as an unmatched registry entry by a similarity rule.

* * * * *